(12) United States Patent
Sparrell et al.

(10) Patent No.: US 7,529,263 B1
(45) Date of Patent: May 5, 2009

(54) LOCAL AREA-NETWORKED SYSTEM HAVING INTELLIGENT TRAFFIC CONTROL AND EFFICIENT BANDWIDTH MANAGEMENT

(75) Inventors: Carlton J. Sparrell, Marblehead, MA (US); Alexander D. Vasilevsky, Westford, MA (US); Chester Ruszczyk, Acton, MA (US); Jinyou Zhang, Woburn, MA (US)

(73) Assignee: Ucentric Systems, Inc., Maynard, MA (US)

( * ) Notice: Subject to any disclaimer, the term of this patent is extended or adjusted under 35 U.S.C. 154(b) by 1057 days.

(21) Appl. No.: 10/345,870

(22) Filed: Jan. 16, 2003

Related U.S. Application Data

(60) Provisional application No. 60/350,431, filed on Jan. 19, 2002.

(51) Int. Cl.
*H04L 12/64* (2006.01)
(52) U.S. Cl. ........................ 370/437; 709/203
(58) Field of Classification Search .......... 370/422, 370/229, 395.41, 395.42, 395.43, 230, 230.1, 370/445, 437; 709/203
See application file for complete search history.

(56) References Cited

U.S. PATENT DOCUMENTS

| | | | | |
|---|---|---|---|---|
| 5,414,785 | A * | 5/1995 | Bergmann | 385/24 |
| 5,416,508 | A | 5/1995 | Sakuma et al. | |
| 5,671,225 | A * | 9/1997 | Hooper et al. | 370/468 |
| 5,694,548 | A * | 12/1997 | Baugher et al. | 709/227 |
| 5,918,182 | A * | 6/1999 | Korus et al. | 455/517 |
| 6,014,694 | A * | 1/2000 | Aharoni et al. | 709/219 |
| 6,069,899 | A * | 5/2000 | Foley | 370/494 |
| 6,480,879 | B1 * | 11/2002 | Zinky et al. | 709/201 |
| 6,754,443 | B2 * | 6/2004 | Nelson et al. | 386/125 |
| 2001/0034790 | A1 * | 10/2001 | Sato et al. | 709/235 |
| 2001/0053149 | A1 * | 12/2001 | Mo et al. | 370/389 |
| 2002/0089928 | A1 * | 7/2002 | Morikawa et al. | 370/229 |
| 2002/0141446 | A1 * | 10/2002 | Koga | 370/468 |
| 2002/0199205 | A1 * | 12/2002 | Sonawane et al. | 725/115 |
| 2003/0079144 | A1 * | 4/2003 | Kakemizu et al. | 713/200 |

(Continued)

OTHER PUBLICATIONS

Part 11: Wireless LAN Medium Access Control (MAC) and Physical Layer (PHY) Specifications, 1999, IEEE, pp. 70-72.*

*Primary Examiner*—Melvin Marcelo
(74) *Attorney, Agent, or Firm*—Stewart M. Wiener

(57) ABSTRACT

A centralized interactive TV recording and reproduction system linking several "Quality of Service" (QoS) reproduction and control units (such as television and audio reproduction receivers), as well as high bandwidth non-QoS legacy devices such as PCs, via a Home Area Network (HAN) to a centralized media server, has novel traffic control to prevent non-QoS devices from establishing and maintaining high-bandwidth network connections during the real-time transmission of media (video and/or audio) information from the media server to the QoS devices. In the preferred embodiment, the media server also contains a gateway device for connecting the HAN to a Wide Area Network, Metropolitan Area Network, and/or the Internet, and the media server also receives video and audio signals from sources such as cable, satellite, terrestrial broadcast, etc. The media server also contains a network router. All traffic from non-QoS devices is routed through the media server, and the media server limits the delivery of packets sent from source non-QoS devices to destination non-QoS devices. As a further refinement to prevent interruptions in real-time transmissions of video and audio information to QoS devices, the information can be buffered at the QoS device level.

26 Claims, 6 Drawing Sheets

U.S. PATENT DOCUMENTS

2004/0268406 A1    12/2004  Sparrell et al.
2005/0149628 A1*    7/2005  Mazzola ..................... 709/224
2006/0242315 A1*   10/2006  Nichols ..................... 709/231
2006/0262769 A1*   11/2006  Ganz et al. ................. 370/346
2007/0109969 A1*    5/2007  Baumeister et al. ......... 370/235

* cited by examiner

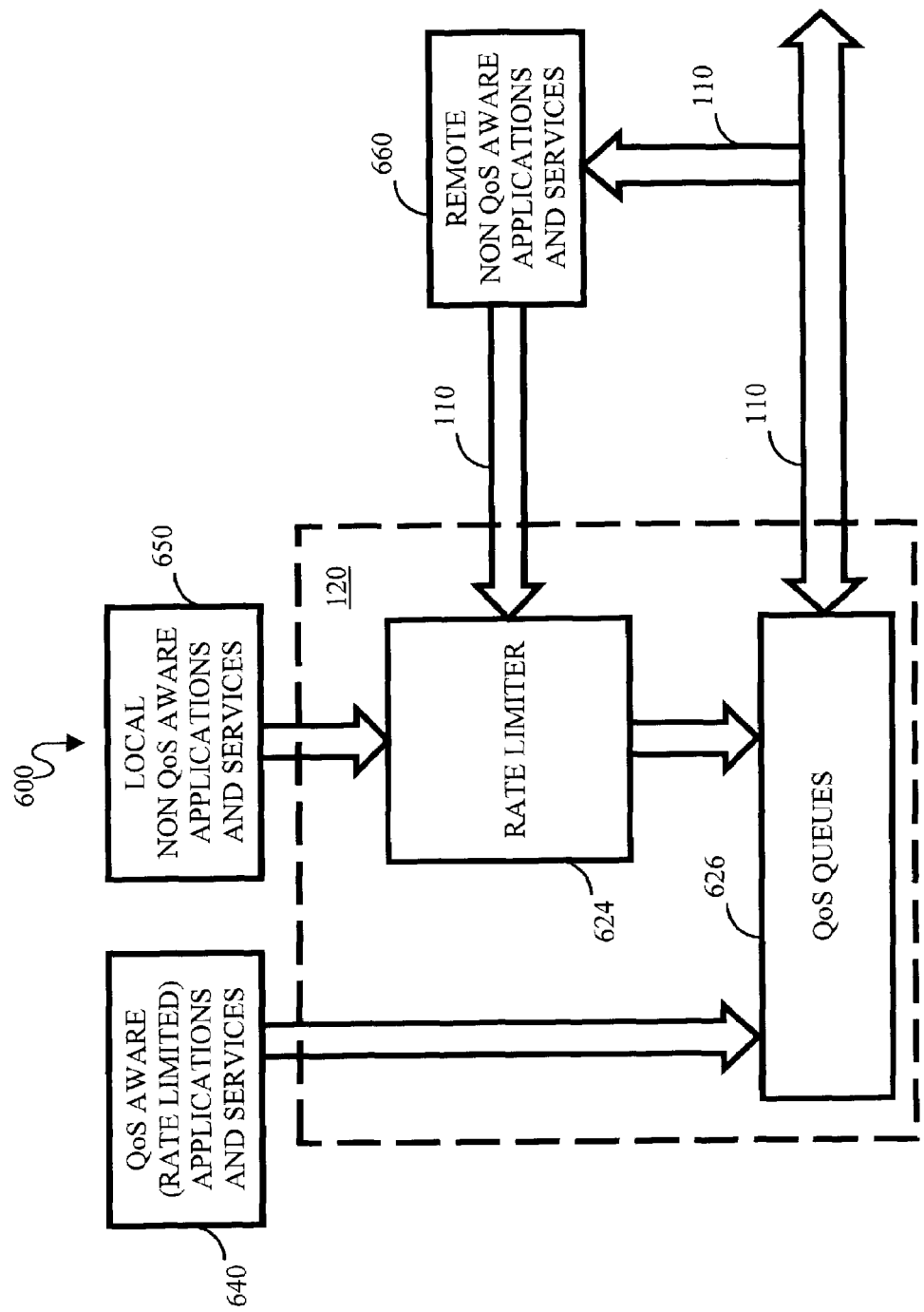

LOCAL AREA-NETWORKED SYSTEM HAVING INTELLIGENT TRAFFIC CONTROL AND EFFICIENT BANDWIDTH MANAGEMENT

CROSS-REFERENCE TO RELATED APPLICATIONS

This application is based upon and claims priority from U.S. provisional patent application Ser. No. 60/350,431, filed 19 Jan. 2002, entitled HOME AREA NETWORK TRAFFIC MANAGEMENT WITH A NETWORKED PERSONAL VIDEO RECORDER.

BACKGROUND OF THE INVENTION

1. Field of the Invention

The present invention broadly relates to networked systems (such as via home area networks and the like) for controlling and distributing digital video recording and playback functions and information throughout t such networked systems. The present invention further relates to the efficient operation of such systems where the systems also include the distribution of the information among network-connected non-QoS devices such as PCs.

2. Background

Interactive digital TV recording and playback devices, which in essence are sophisticated set-top boxes with recording capabilities, are becoming more commonplace with advances in technology and the downward trend in prices. Along with a playback quality that is superior to analog-based systems, interactive digital TV recording and playback devices, e.g., Digital Video Recorders (DVRs), Personal Video Recorders (PVRs), Personal TV Receivers (PTRs), Personal Video Stations (PVSs), and Hard Disk Records (HDRs), also allow other features that are not practical with analog-based systems. Among such features is the ability of a user to engage in "live-pause" or "elastic" recording and playback.

Live-pause recording and playback allows a viewer/user with such an enabled system to watch a program live while the program is being simultaneously recorded, and also allows the user to use "trick play" modes or functions such as pausing the program or rewinding the program. While the recorded program is being paused or rewound, the system continues to record the program in a buffer memory. The system keeps track of where in memory the user has exited to perform trick play functions. The user can later return to the previous point of viewing in the program or skip with a "fast forward" operation up to the most current point of recording. Live-pause recording and playback allows the user the flexibility of watching a program live, already recorded, or a combination of both live and recorded viewing, along with other interesting trick play modes.

Existing interactive digital TV recording and playback devices, however, are designed to work with a single TV. Since an interactive digital TV recording and playback devices embody costly components such as a video encoder, e.g., MPEG 2 and a hard drive device (HDD), it is not generally cost effective to provide multiple interactive digital TV recording and play-back devices in a network system such as a Home Area Network (HAN).

Home Area Networks (HANs) are typically small-scale electronic cable, wire or wireless based communication networks used to interconnect a variety of small to moderate sized appliances, computers, and consumer electronic devices. Their cost and attributes make them especially suitable for typical homes or smaller buildings. Communication between devices may be via one or more of several well-known protocols or information formats. HANs can be general in their functionality, such as controlling the operation of several in-home devices such as appliances, television receivers, telephonic devices and burglar alarm systems, or they may be more specialized in their functionality, such as only controlling the operation of several television receivers and connecting the receivers to an external television program source such as a cable or satellite television service provider.

A well-designed and well-implemented HAN can allow resource sharing between one or more workhorse devices and other attached devices, providing such other attached devices with greater capability and functionality than they would otherwise possess.

Of special interest to the inventors of the subject matter of this Letters Patent are home area-networked interactive TV recording and playback systems having multiple television receivers/video display units or reproduction devices. It is desirable to be able to allow the playback of the same program on different receivers/video display units. Also desirable is the ability to allow live-pause playback and delayed viewing playback from more than one receiver. Further, it is desirable to allow a user to pause the playback of a program (whether in a live-pause or conventional playback mode) on one receiver, and to resume playback of the program from the pause point via one of the other receivers.

Quality of Service (QoS) devices (which are capable of self rate-limiting to comply with bandwidth allocations, and may be capable of negotiating with a system resource manager for varying amounts of bandwidth) such as newer digital television receivers and newer digital audio receivers are specially designed to better facilitate video and audio information traffic over HANs and similar types of networks, either between devices and a media server, or directly between two devices. However, a fully operational HAN often has non-QoS devices (which, by definition do not support QoS without additional hardware and/or software) connected thereto such as PCs and other "legacy" devices in order to make the functionality of the HAN more comprehensive.

Without the ability to integrate the QoS and non-QoS devices in the same HAN, individual networks would be needed to support QoS and non-QoS or legacy devices, respectively, leading to a redundant, costly and complex solution. It is also possible to retrofit the non-QoS devices with hardware and software interfaces to make them QoS-aware or capable, so that all network devices support advanced QoS protocols. This, however, is also a costly proposition.

The bandwidth requirements of the PCs and other non-QoS devices often require a great deal more bandwidth than is needed for video and/or audio stream transfers. Unless the video and audio receivers contain large buffer memory, which introduces a delay in reproduction of video and/or audio, the reproduction of video and/or audio streams in such systems is time sensitive, so that interruptions or delays in the transmission of video and/or audio information can lead to missed or lost information during reproduction or storage. As a result, when two non-QoS devices establish a high-bandwidth network connection, they often capture the network capacity for periods of time to the exclusion of, and at the expense of the QoS devices. Time-sensitive video and/or audio information may then be delayed or lost while the network is captured by the non-QoS devices.

What is of great interest but not provided in the prior art, is a HAN-based system that is flexible enough to efficiently distribute time-sensitive digital video and/or audio information to QoS devices, but also allow information transfers among non-QoS devices that require high bandwidth, without degradation in the normal performance of either the QoS or non-QoS devices.

SUMMARY OF THE INVENTION

In view of the aforementioned problems and deficiencies of the prior art, the present invention provides a system for localized distribution of information, including audio-visual information. The system at least includes a local area network (LAN), one or more Quality of Service (QoS) devices coupled to the LAN, the QoS devices adapted to receive and reproduce media information (as used herein "media" encompasses audio-video (images with sound), video only, and/or audio only), one or more non-QoS devices coupled to the LAN, any such non-QoS devices adapted to transmit and receive information using a high bandwidth, and a media server coupled to the LAN, the media server adapted to receive and store media information reproducible by the QoS devices, the media server being adapted to provide on-demand media information in a reproducible format to any QoS device. The media server at least includes a gateway device adapted to couple the LAN to external media information sources, and a router adapted to control the routing of such media information in the LAN. The media server routes all communications between non-QoS devices through the router. The media server also causes a source non-QoS device to limit the bandwidth of its information transfers to a destination non-QoS device by limiting the number of packets forwarded to the destination device, which further limits the number of acknowledgment signals from the destination non-QoS device that are retransmitted to the source non-QoS device, to avoid network collisions with real-time media information transmitted over the LAN. The media server is also capable of limiting incoming traffic that does not rely on acknowledge packets by limiting the number of packets routed by a particular source to the assigned bandwidth for that source, allowing the rate-limiting mechanisms in the source application to scale the generations of packets appropriately. The media server is capable of blocking transfer of packets for services that do not appropriately rate limit, such as blocking by port number.

The present invention also provides a method for locally distributing media information wherein the method includes the steps of providing a local area network that includes one or more QoS devices coupled thereto, one or more non-QoS devices coupled thereto, and a media server coupled thereto, coupling, via said media server, said local area network to one or more external sources of information, including media content, receiving and reproducing media content and other information at said networked QoS devices, transmitting and receiving media content and other information having a high bandwidth information, receiving, processing, and storing media content from the one or more external information sources that is reproducible by said networked QoS devices, distributing, upon demand of any of said networked QoS devices, stored media content in a reproducible format to said demanding networked QoS device from said media server, controlling all communications between said networked non-QoS devices and between any of said networked non-QoS devices and an external non-QoS device by routing such communications through said media server, and further controlling all communications between said networked non-QoS devices and between any said networked non-QoS device and an external non-QoS device by limiting bandwidth for communications between such devices, thereby avoiding network collisions with real-time media content distributed over said local area network by said media server.

BRIEF DESCRIPTION OF THE DRAWING FIGURES

Features and advantages of the present invention will become apparent to those skilled in the art from the description below, with reference to the following drawing figures, in which:

FIG. 6 is a functional block diagram of the media server and QoS and non-QoS system devices connected to the network;

DESCRIPTION OF THE PREFERRED EMBODIMENTS

Figure 1:
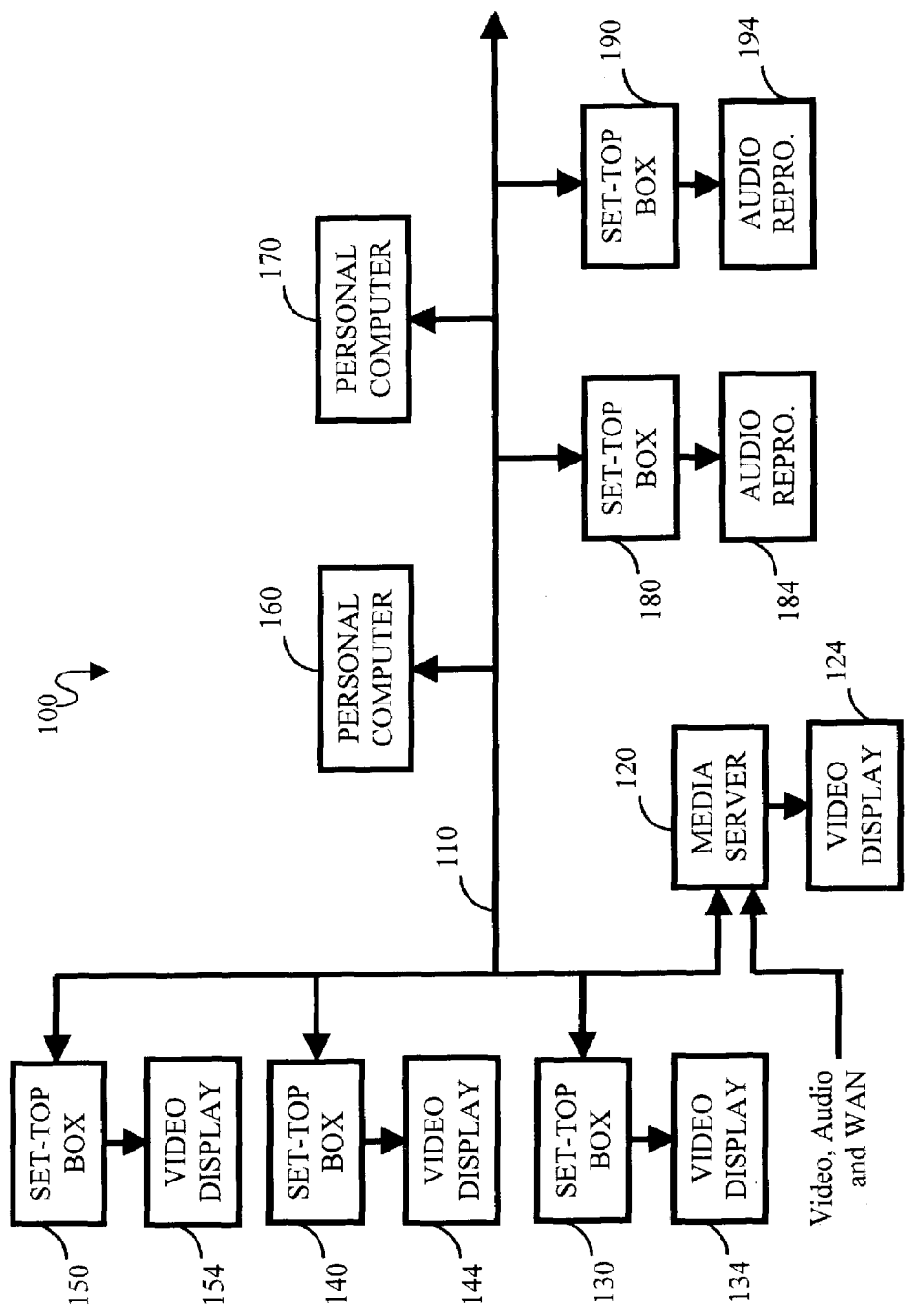
FIG. 1 is a schematic block diagram of the present-inventive home area-networked interactive digital TV recording and playback system with traffic management leading to reduced bandwidth usage of non-Quality of Service devices such as legacy PCs connected to the network.

The present invention allows a local area network (LAN) to efficiently control information traffic from sources within and external to the network so that devices prone to making high bandwidth connections do not overwhelm the network to the extent that the flow of time-critical information such as digital video streams being delivered to enable live or live-pause viewing, are not interrupted or altered. In the preferred embodiment, the Open Systems Interconnect (OSI) network model/standard is employed, although other models may be employed.

Although not so limited, the present invention is especially useful for a networked system having a centralized digital media recording and reproduction devices (such as television receivers and audio receivers), along with legacy devices such as PCs. In the preferred embodiment, the recording and reproduction devices are Quality of Service (QoS) devices, capable of not only self-limiting their data transfer to assigned bandwidths, but also capable of negotiating with a centralized media server for a different amount of bandwidth than that currently assigned to it. The media server contains the primary system digital media recorder, as well as the system router and system gateway for interfacing the network with external networks. A QoS system device is capable of communicating with any other system device.

In order to prevent non-QoS devices, such as network PCs from overwhelming the network when other time-critical communications are needed, the present invention does not allow direct communication between non-QoS devices, but, rather, forces all communications from non-QoS devices to be routed through the media server, e.g., by assigning IP addresses and subnet masks to non-QoS devices such that non-QoS devices cannot "see" one another on the networked system. This prevents non-QoS devices from establishing unfettered high bandwidth connections. When a source PC attempts to send information to a destination PC, the source PC provides a destination address to the media server, along with its request to send information. While the initial information sent to the media server may use a high bandwidth, the media server employs a rate limiter to buffer and limit the rate at which information is forwarded to the destination address. Since the destination PC receives information at a rate slower than the initial transmission rate from the source PC, the destination PC sends acknowledgment signals at a slower rate than would be initially expected. In response to the lower acknowledgment signal rate, the source PC lowers its transmission rate. Thus, the rate limiter has the effect of reducing the effective bandwidth used by non-QoS devices such as PCs to communicate on the network.

Some PC applications generate packets that do not rely on acknowledgements, for example, User Datagram Protocol (UDP) packets running over IP protocol. When a source PC attempts to send non-acknowledged packets to a destination PC, the media server employs a rate limiter to buffer and limit the rate at which data is forwarded to the destination address. The receiving application may communicate back to the sending application the received data rate and the sending application may self-limit the generations of packets. If the sending application does not limit the generation of packets, the media server will block the forwarding of packets from this sending application. In the preferred embodiment, the media server is capable of alerting the user to the presence of this application through, for example, onscreen alerts.

Non-acknowledged packets generated from outside the home system (e.g., from a Wide Area Network (WAN), a Metropolitan-Area-Network (MAN), or the Internet), will be rate limited before being routed to the Home Area Network (HAN).

FIG. 1 is a general diagram of a networked system 100 according to the present invention for communicating information among network devices, including QoS devices and non-QoS devices, and having information traffic control to limit the bandwidth used by non-QoS devices. As used herein, QoS devices are devices that are capable of controlling their own bandwidth insertion into their network connection queues. Such QoS devices are represented herein as media (audio-video or audio) clients, storage devices, tuners, etc. Non-QoS devices as used herein are devices that do not include the additional hardware and/or software necessary to support the QoS protocols/services, e.g., incapable of limiting their data transfer rates, and are represented herein as personal computers. The networked system 100 nominally contains a local area network (LAN) 110, which is a home area network (HAN) in the preferred embodiment, but need not be limited to being a HAN. The HAN 110 provides all of the major communication connections between the components in the networked system 100, and is essentially a computer bus adapted for both digital communication and the transport of digital video and digital audio multimedia content compatible with digital television receivers. Those skilled in the art will appreciate that there are a number of bus standards that can be employed without departing from the scope of the present invention.

A media server 120, as described supra, controls the operation of the network system 100, and performs the centralized video recording and storage functions, as well as the primary routing, gateway, and traffic control functions for limiting bandwidth of the communications over the network system 100. The media server 120 has several inputs for receiving video programming, audio programming, and other media information received from sources such as WANs, MANs, and/or the Internet.

The networked system 100 includes, for example, a video display unit or television receiver 124 connected directly to the media server 120, and several QoS video and audio reproduction devices. Video display units 134, 144 and 154, are typically television receivers connected to set-top boxes 130, 140 and 150, respectively. Most legacy video display units do not have a network connection capability, so network adapters such as set-top boxes are provided to interconnect the video display units to the LAN 110 such that the video display unit, set-top box combinations function as QoS devices. The set-top boxes perform many functions, including decoding digital video streams (which may have been encoded, for example, in one of the Motion Picture Experts Group (MPEG) standards such as MPEG-2, and MPEG-4), decompressing the decoded digital video streams, and blending the video graphics with graphical user interface (GUI) graphics for display by the video display units 134, 144, 154.

Similar to the video display unit-set-top box combinations (also generically known as video clients), are audio clients represented by the audio reproduction devices 184 and 194, and the set-top boxes 180 and 190, respectively. The set-top boxes 180 and 190 perform similar functions to the other set-top boxes 130, 140, 150 in the networked system 100, except that the information stream is digital audio rather than digital video. As a point of nomenclature, the term "video" in disclosure is interchangeable with composite video and audio signals representing television-based signals.

The networked system 100, also contains one or more non-QoS device, represented in FIG. 1 by the personal computers (PCs) 160 and 170.

In the preferred embodiment, the media server 120 is a fully functional advanced set-top box, and each media client (e.g., video display unit-set-top box combination 130&134, 140&144, or 150&154 and/or audio reproduction—set-top box combination 180& 184, 190& 194) has a set-top box with some functionality removed (e.g., tuners, hard-drive, reduced processing power, etc.). In an alternative embodiment, one or more of set-top boxes of the media clients is functionally equivalent to the media server 120. The determination of which media server capable device performs the function of routing depends on the location of the media server capable devices within the networked system.

Figure 2:
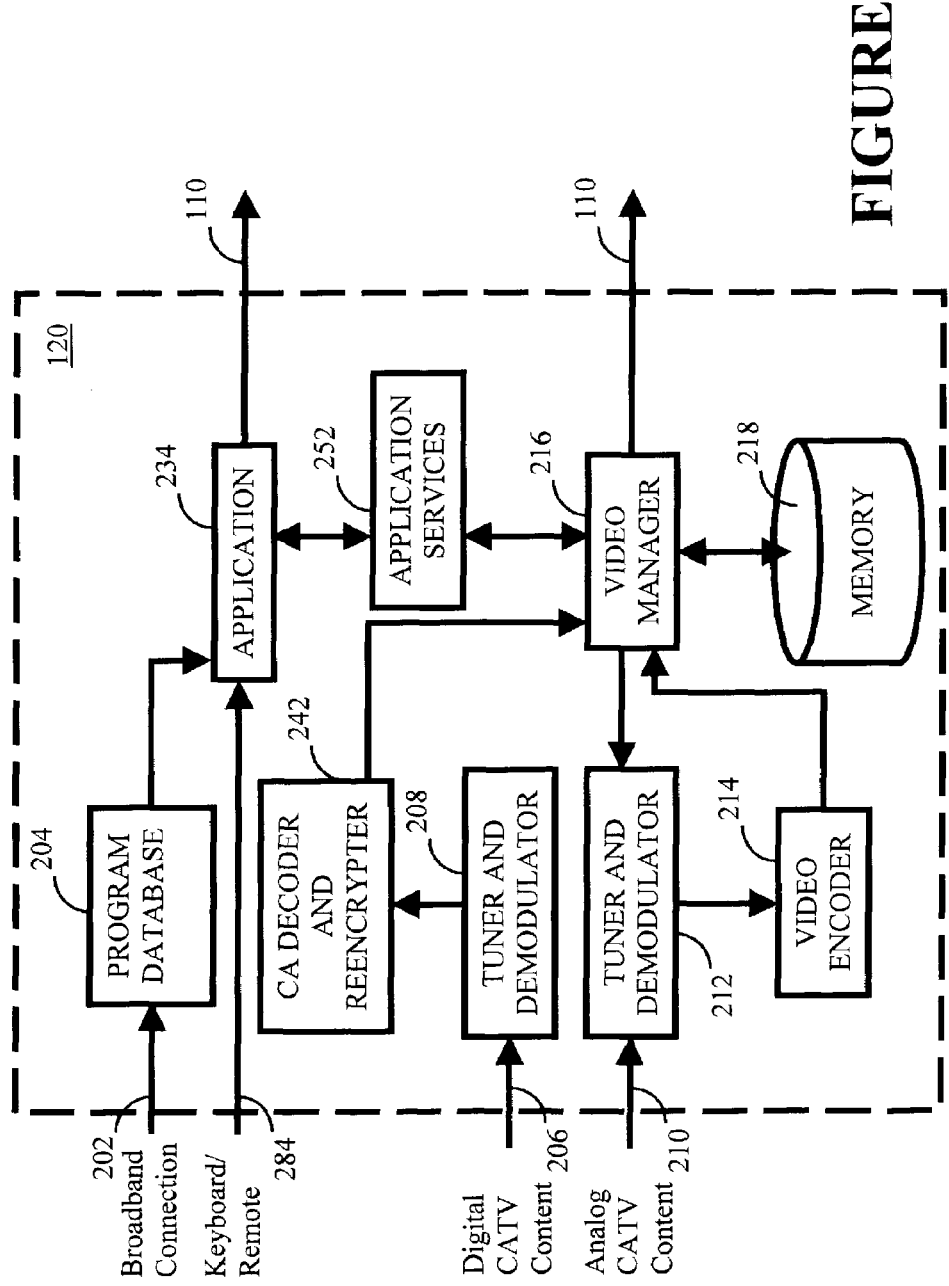
FIG. 2 is a schematic block diagram of the media server of the system in FIG. 1.

FIGS. 2 and 4-8 together, provide a more detailed diagram of the media server 120 of the present invention. Turning to FIG. 2, a program database 204 obtains information used by the media server 120 to construct an electronic program guide (EPG) to present details about programs to the networked system 100 and to viewers in the form of a graphical user interface. In the preferred embodiment, the program database 204 obtains programming information via a broadband or wide area network (WAN) connection 202 to a host computer (not shown in the figure). Those skilled in the art will appreciate that the programming information can be obtained through other types of connections, such as, inter alia, a cable MODEM, xDSL, POTS MODEM, satellite, and fixed terrestrial wireless.

For programs to be viewed and reproduced by the networked system 100, the program database 204 provides information such as the program names, start and end times, channel designations, and additional information about the program such as program ratings, and program synopses. In an alternative system, the program guide information can be delivered in a different manner, such as in a video program stream as is known in the art. That is, along with the other audio and video information representing a television channel, for example, headers and other program description information can be included (e.g., program description information can be inserted in the vertical blanking interval of an NTSC television signal).

The media server 120 also receives digital and analog television program signals (via inputs 206 and 210) to be processed by tuner and demodulator circuits 208 and 212, respectively. The tuner and demodulator circuits 208, 212 provide the function of tuning into program channels selected to be received by the networked system 100 and then demodulating them in a manner known in the art.

The analog content signal need not initially be in a modulated form, as in the example, but may be unmodulated, in which case the tuning and demodulation circuit 212 is bypassed. Such an unmodulated analog content signal may be coupled to the media server 120 via an "S-video" jack. Similarly, the digital content signal can be received either in a modulated form, or an unmodulated form (such as a straight ATSC stream), which for the latter case, the tuning and demodulation circuit 208 is bypassed.

The television signals and other program signals are stored in memory 218 (e.g., a hard disk) in a predefined manner or as dictated by user commands implemented a keyboard or remote control device via input 284. The input signals are in response to a graphical user interface displayed on the receiver screens. In the preferred embodiment, the memory 218 is a high-capacity hard disk drive, although other forms of memory systems are compatible. The writing of program content (e.g., media) information to memory and the reading of program content information from memory are controlled by a video manager 216.

Prior to storage in memory 218, the analog program signals from the tuning and demodulating circuit 212 are digitized and then encoded via a video encoder 214, using a digital compression scheme (e.g., MPEG2 or MPEG4). In the preferred embodiment, the program signals are stored as Elementary Streams, as will be familiar to those skilled in the art. Where appropriate, the digital program signals are decoded and re-encrypted by the circuit 242 prior to storage as an Elementary Stream in the memory 218. The exact point of decryption in the system is a matter of design choice dictated by such factors as the legal requirements and restrictions of the content providers who broadcast the program signals. These requirements and restrictions relate to preventing unauthorized access and copying of programs. Where allowable, the circuit 242 can decrypt and then re-encrypt program streams using symmetric encryption algorithms, as will be understood by those skilled in the art, so that the system receivers need not contain substantial hardware and/or software complexities.

Figure 3:
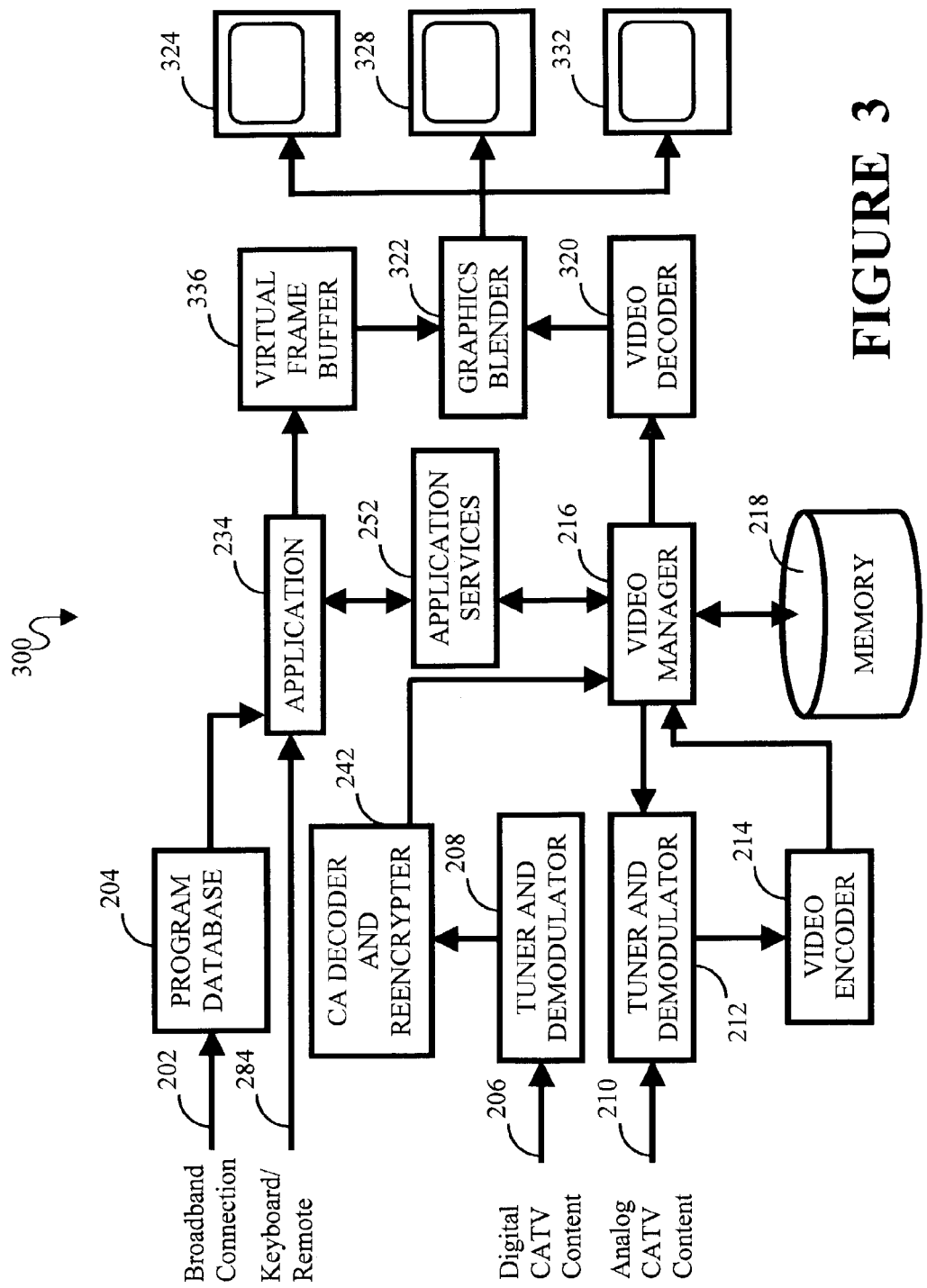
FIG. 3 is another illustration of the system in FIG. 1, with emphasis on the media server components.

The networked system 300 illustrated in FIG. 3 contains the media server 120, as detailed in FIG. 2, along with video reproduction components. A graphics blender 322 performs the function of blending disparate video streams into one signal compatible with the displays 324, 328 and 332. Typically, this involves combining an interactive GUI having the program guide information with the program being viewed.

A virtual frame buffer 336 holds the GUI information for refreshing the video display units 324, 328 and 332. In the preferred embodiment, video decoding and graphic blending are local to the video display units 324, 328, 332. However, it is possible to integrate these functions into a more complex media server.

In operation, a viewer can retrieve programming from the media server 120 from any of the networked video display units. The same program can be presented simultaneously by more than one video display unit if desired. Further, live-pause control and playback can be executed from any networked video display unit, allowing a program to be presented in the live-pause mode in a seamless manner from more than one video display unit. For example, a program being presented on one video display unit can be paused. Later, the same program can be resumed from the same pause point and presented, but from a different video display unit.

Therefore, both the presentation and control of programming can be distributed among multiple video display units in a seamless manner if desired. It should be appreciated by those skilled in the art that all trick play modes can be distributed across multiple vide display units for a single program as described above with respect to the "pause" mode. For example, a viewer who has previously paused or rewound a program being recorded in live-pause mode can decide to "fast forward" to another point using one video display unit, and then resume viewing from the stopping point (of the fast forward operation) using another video display unit.

The communication and transport of program (media) information between the media server and the various user recording and reproduction devices (or client devices, or video display units/TV receivers) can be via a number of network and streaming protocols, including, inter alia: Real-Time Transport Protocol (RTP); Real-Time Streaming Protocol (RTSP); Transmission Control Protocol (TCP); User Datagram Protocol (UDP); Network File System (NFS) Protocol; Web-Distributed Authoring and Versioning (WebDAV) Protocol; Server Message Block (SNB) Protocol; IEEE 1394 Protocol; and Internet Small Computer System Interface (iSCSI) Protocol.

The system users communicate with the media server 120 via a user interface or Application Unit 234, which converts user commands to commands compatible with the media server 120. The Application Unit 234 is also responsible for generating the GUI containing an electronic program guide (EPG) for display, and input by an Application Services Unit 252. The Application Services Unit 252 controls the recording and playback of programs. Under the direction of the Application Unit 234 and utilizing program guide information, the Application Services Unit 252 establishes the necessary memory needed for recording a particular program, whether the recording is of the traditional or live-pause variety.

The networked system can be administered using many suitable access and conflict resolution schemes for managing the flow of media information between the media server 120 and the several video display units 324, 328, and 332, without departing from the scope of the present invention. For example, older Ethernet approaches using token rings will suffice. However, it will be appreciated by those skilled in the art that later Ethernet approaches such as the 10/100BaseT UTP (Universal Twisted Pair) utilizing Carrier Sense Multiple Access (CSMA) with Collision Detect (CSMA/CD) will also suffice. Using the latter approach, a station/receiver desiring to transmit information seeks a free carrier line. When a free line is obtained, the station/receiver begins transmitting while simultaneously checking for collisions with other stations/receivers attempting to use the same carrier line. If a collision is detected, transmission halts and the station/receiver releases the carrier line for a random or pseudo-random amount of time until the carrier line appears to be free, after which, retransmission is attempted.

Still other approaches such as Carrier Sense Multiple Access with Collision Avoidance (CSMA/CA) can be used. Examples of networks using the CSMA/CA scheme include the 802.11a, 802.11b and 802.11g Wireless Networks.

Examples of wired networks using CSMA/CA include 802.11a, 802.11b and 802.11g over coaxial cable. Instead of attempting to detect collisions, the networked wireless devices look for an available transmission band, and then transmit after a random or pseudo-random amount of time. If an acknowledgment signal (ACK) is received within an expected window, the devices assume that no collision has occurred. If an ACK signal has not been timely received, the devices assume there has been a conflict with another device, and then attempt to retransmit the information.

Yet other approaches (e.g., Hiperian/2 and bluetooth wireless, and IEEE 1394 wired) include those employing a Time Division Multiple Access (TDMA) scheme. The stations/receivers can transmit during fixed designated time slots, or in the case of schemes such as IEEE 1394, during a guaranteed, but variably located time slot. It should be noted, however, that the present-inventive traffic control and bandwidth limitation methods obviate the need for TDMA schemes, making schemes such as CSMA/CD a better choice in the operational environment described. In other words, time-critical video information and the like need not necessarily be broken into time division slots since there is almost no likelihood that non-QoS devices will overwhelm the system with high bandwidth connections.

As an additional protection against having the reproduction of time-critical information interrupted, the QoS reproduction devices will also buffer audio and video information to the extent possible.

Figures 4, 5:
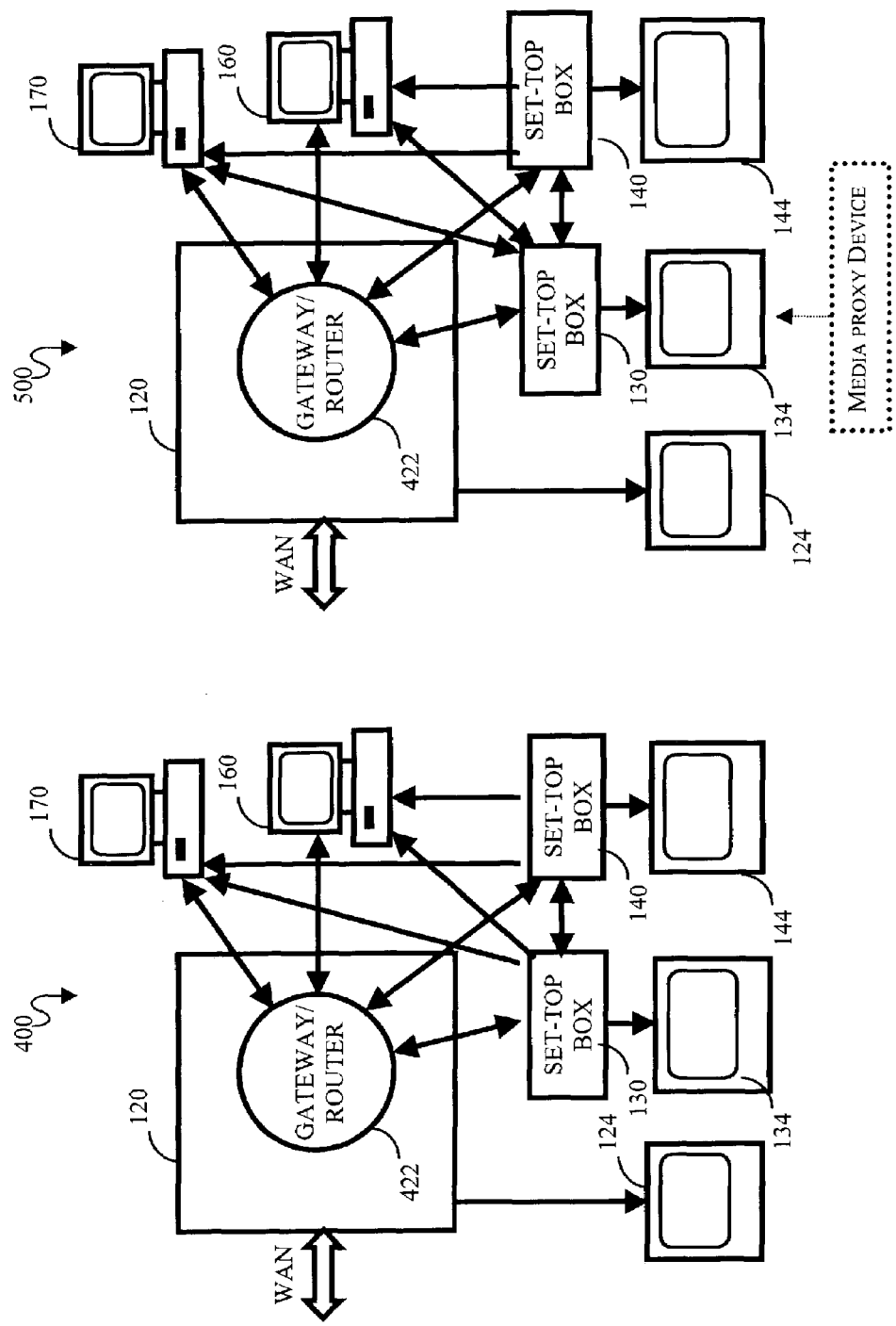
FIG. 4 is a generalized illustration of the media server and home area network clients of the present invention.
FIG. 5 is an alternative generalized illustration of the media server and home area network clients of the present invention.

Essential to the operation of the media server 120 are router and gateway functionality represented by the number 422 in FIGS. 4 and 5. As was previously described, the non-QoS devices such as the PCs 160 and 170 may only transmit information through the router, and not directly to other system devices in the preferred embodiment. On the other hand, QoS devices represented by the media clients (the respective video display units 134, 144 and set-top boxes 130, 140 combinations) communicate directly with each other without having to route communications through the router 422.

The networked system 400 illustrated in FIG. 4 strictly adheres to the preferred feature that the PCs 160, 170 directly communicate only with the media server 120, while QoS devices represented by the "media clients" (the respective video display unit 134, 144, set-top box 130, 140 combinations) can engage in peer-to-peer communications. These "media clients" may also engage in direct communications with the PCs 160, 170, but not vice versa.

In an alternate embodiment, the network system 500 illustrated in FIG. 5 also includes at least one "media proxy device" (represented by the video display unit 134, set-top box 130 'media client' combination) embodying functionality that allows a PC 160 or 170 to attempt to communicate directly through the "media proxy device" if possible, rather than only being routed indirectly through the media server 120 (as used herein, a media proxy device includes the functionality of a QoS device plus that capability of communicating directly with non-QoS devices, typically for specific limited applications such as bandwidth limiting). If the media proxy device is able to transfer information from the PC within the assigned bandwidth, it will route the information to the destination address without media server intervention. Otherwise, it will redirect the attempted communication through the media server.

The gateway 422 of the media server 120 includes those functions generally associated with gateway devices, including assigning network masks and addresses using protocols such as the Dynamic Host Configuration Protocol (DHCP), routing between the LAN and external information sources, e.g., WAN, MAN, and/or Internet, NAT translation, and Internet Protocol masquerading, as will be understood by those skilled in the art. In the preferred embodiment, the gateway/router 422 also contains a resource manager responsible for allocating the appropriate bandwidth for network communication for QoS and non-QoS device information transfers. The gateway/router 422 is also operative to control the communications by non-QoS devices, restricting such devices to communication with the media server 120 (via the gateway/router 422) or any media proxy servers attached to the networked system 100.

FIG. 6 illustrates a general network scheme 600 for handling both QoS and non-QoS device information transfers. From that figure, it can be seen that communications from QoS devices can be placed directly into a QoS queue or queues 626, without routing through the rate limiter 624. However, non-QoS device—whether from local 650 or external 660 sources—must be first routed through the rate limiter 624. One approach to determining whether attempted communication is from a QoS or non-QoS device is to interpret the Type of Service (TOS) bits that precede the communication. While the QoS Queues 624 are shown as part of the media server 120, alternate approaches can locate them outside of the physical structure of the media server 120.

Figure 8:
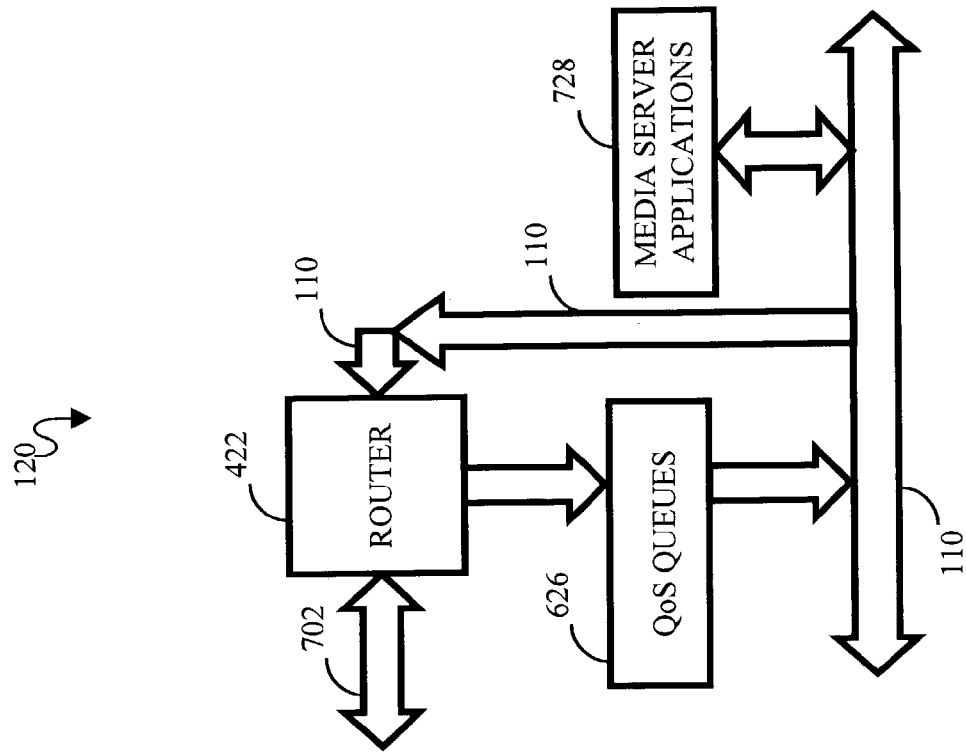
FIG. 8 is an alternative general architectural diagram of the media server of the present invention.
Figure 7:
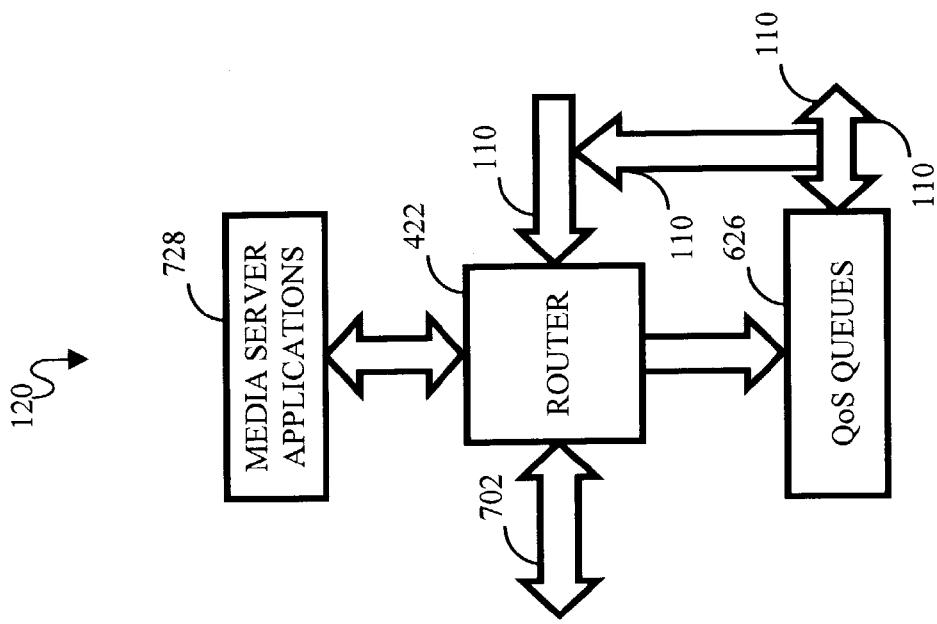
FIG. 7 is a general architectural diagram of the media server of the present invention.

FIGS. 7 and 8 show other embodiments of architectures for the media server 120, given the above description, showing "media server applications" 728 to generically represent the functions of the media server 120, as described supra.

Variations and modifications of the present invention are possible in light of the above teachings. It is therefore to be understood that, within the scope of the appended claims, the present invention may be practiced other than as specifically described herein.

What is claimed is:

1. A system for localized distribution of information, including media content, said localized information distribution system comprising:
    a local area network;
    first and second non-QoS devices coupled to said local area network, wherein said first and second non-QoS devices are operative to transmit and receive media content and other information using high bandwidth;
    a media server coupled to said local area network that is operative to couple one or more external information sources to said local area network,
    wherein said media server is further operative to control all communications between said first and second non-QoS devices and between either first or second non-QoS device and an external non-QoS device by routing such communications through said media server such that said first and second non-QoS devices are prohibited from directly communicating with one another and with the external non-QoS device over said local area network.

2. The localized information distribution system of claim 1 wherein said media server is further operative to control communications between said first and second non-QoS devices and between either the first or second non-QoS device and the external non-QoS device by limiting the bandwidth for communications to or from the first or second non-QoS device.

3. The localized information distribution system of claim 1 wherein first and second QoS devices are operative to communicate directly with one an other such that communications between first and second QoS devices are not required to pass through said media server.

4. The localized information distribution system of claim 1 wherein said media server includes a memory for storing media content received and processed by said media server.

5. The localized information distribution system of claim 4 wherein said memory is a high-capacity hard disk.

6. The localized information distribution system of claim 4 wherein said media server includes a video manager operative to control writing of media content to said memory for storage thereof and reading of stored media content from said memory for distribution thereof to either the first or second QoS device.

7. The localized information distribution system of claim 1 wherein said media server includes a gateway for coupling the one or more external information sources to said local area network.

8. The localized information distribution system of claim 1 wherein said media server includes a router for controlling distribution of information, including media content, in said local area network, wherein all communications between first and second non-QoS devices and between either the first or second non-QoS device and an external non-QoS device is routed through said router.

9. The localized information distribution system of claim 3 wherein said media server includes the Carrier Sense Multiple Access with Collision Detection protocol for managing the distribution of information, including media content, between said media server and the first and second QoS devices.

10. The localized information distribution system of claim 3 wherein said media server includes the Carrier Sense Multiple Access with Collision Avoidance protocol for managing the distribution of information, including media content, between said media server and the first and second QoS devices.

11. The localized information distribution system of claim 3 wherein first QoS device is operative to communicate directly with the first non-QoS device but the first non-QoS device cannot communicate directly with first QoS device.

12. The localized information distribution system of claim 3 wherein said media server includes a rate limiter operative to limit bandwidth of non-QoS communications to bandwidth available after bandwidth for QoS communications has been assigned.

13. The localized information distribution system of claim 3 wherein the first QoS devices is a media proxy device that is operative to communicate directly with the first or second non-QoS device when such communications are within bandwidth limits established by said media server, and is further operative to redirect communications with either the first or the second non-QoS device through said media server when such communications exceed bandwidth limits established by said media server.

14. The localized information distribution system of claim 1 wherein said media server is operative to block communications between first and second non-QoS devices and between either the first or the second non-QoS device and an external non-QoS device that exceeds communication bandwidth limits established by said media server for communications between such devices.

15. The localized information distribution system of claim 14 wherein said media server is operative to provide a perceptible alert whenever said media server blocks communications between non-QoS devices.

16. The localized information distribution system of claim 3 wherein each of first and second QoS devices is operative to buffer received information, including media content.

17. The localized information distribution system of claim 1 wherein said media server includes a rate limiter operative to limit bandwidth of non-QoS communications to bandwidth available after bandwidth for QoS communications has been assigned, and one or more QoS queues, and wherein communications to and from a first and second QoS devices are routed directly to and from said one or more QoS queues, bypassing said rate limiter, and wherein communications to and from the first and second non-QoS devices are routed to and from said rate limiter prior to being routed to said one or more QoS queues.

18. The localized information distribution system of claim 1, wherein said local area network is a home area network.

19. A method for locally distributing information, including media content, said method comprising:
receiving and storing media content from one or more external information sources in a media server that is reproducible by a first QoS devices;
distributing stored media content in a reproducible format from the media server to the first QoS;
controlling all communications between first and second non-QoS devices and between either the first or second non-QoS devices and an external non-QoS device by routing such communications through the media server by limiting bandwidth for communications transmitted to or received by either the first or second non-QoS devices, thereby avoiding network collisions with the distribution of the stored media content.

20. The method of claim 19, further comprising:
buffering received information, including media content, in first QoS device.

21. The method of claim 19, further comprising:
using a rate limiter to limit bandwidth of communications between said non-QoS devices and between any said non-QoS device and an external QoS device to bandwidth available after bandwidth for communications between QoS devices is assigned by said media server.

22. The method of claim 19, further comprising managing the distribution of information, including media content, between said media server and first QoS device using Carrier Sense Multiple Access with Collision Detection.

23. The method of claim 19, further comprising managing the distribution of information, including media content, between said media server and said networked QoS device using Carrier Sense Multiple Access with Collision Avoidance (CSMA/CA).

24. The method of claim 19, further comprising:
configuring the first QoS device as a media proxy device;
directly routing communications between said media proxy device and either the first or second non-QoS device when such communications are within bandwidth limits established by said media server; and
redirecting communications between said media proxy device and either the first or second non-QoS device through said media server when such communications exceed bandwidth limits established by said media server.

25. The method of claim 19, further comprising:
blocking communications between the first and second non-QoS devices and between the first QoS device and an external non-QoS device that exceed bandwidth limits established by said media server for communications between such devices.

26. The system of claim 19, further comprising:
providing perceptible alert whenever said media server blocks communications between the first and second non-QoS devices.

* * * * *